UNITED STATES PATENT OFFICE.

HEINRICH TRENK, OF BERLIN, GERMANY, ASSIGNOR TO HIMSELF, JEAN BALLATSCHANO, AND CONSTANTIN BALLATSCHANO, OF BUCHAREST, ROUMANIA.

COMPOSITION FOR USE IN TANNING.

SPECIFICATION forming part of Letters Patent No. 236,115, dated December 28, 1880.

Application filed July 20, 1880. (No specimens.) Patented in Germany April 24, 1880, and in France March 15, 1880.

*To all whom it may concern:*

Be it known that I, HEINRICH TRENK, of Berlin, Prussia, Germany, have invented a new and Improved Composition of Matter for Tanning, of which the following is a specification.

The object of my invention is to provide a new and improved composition of matter to be used in tanning for the purpose of making the leather dense and compact, and for augmenting and assisting the action of the other tanning substances or compositions.

The improved composition of matter consists of a concentrated solution of crude tartar or argol, to which a small quantity of chloride of zinc or some analogous salt, such as muriate of ammonia, chloride of nickel, chloride of calcium, &c., is added. The proportions are one thousand parts of the tartar solution to fifteen parts of the salt.

This liquid is to be used to treat the hides or skins before or after they are submitted to the action of a tanning-liquid or tanning matter, and this liquid is especially well adapted for treating skins before tanning them with vegetable matter; for instance, a skin can be tanned in thirty days with a solution of one thousand parts water, thirty parts of pyroligneous acid, and one part of tannin, if previously treated with the above-described liquid, whereas, without the said treatment, the last-mentioned tanning solution would have no effect upon the hide.

The within-described liquid is never to be used alone, but always with some other tanning-liquid.

Having thus described my invention, what I claim as new, and desire to secure by Letters Patent, is—

The herein-described composition of matter to be used in tanning, consisting of a concentrated solution of crude tartar or argol, to which a small quantity of chloride of zinc or some analogous salt, such as muriate of ammonia, chloride of nickel, or chloride of calcium, is added, all as specified and set forth.

This specification signed by me this 25th day of June, 1880.

HEINRICH TRENK.

Witnesses:
 FRANZ SCHULTZ,
 BERTHOLD ROI.